E. L. FOGLEMAN.
DRILL.
APPLICATION FILED JUNE 8, 1918.
1,299,318.
Patented Apr. 1, 1919.
3 SHEETS—SHEET 1.
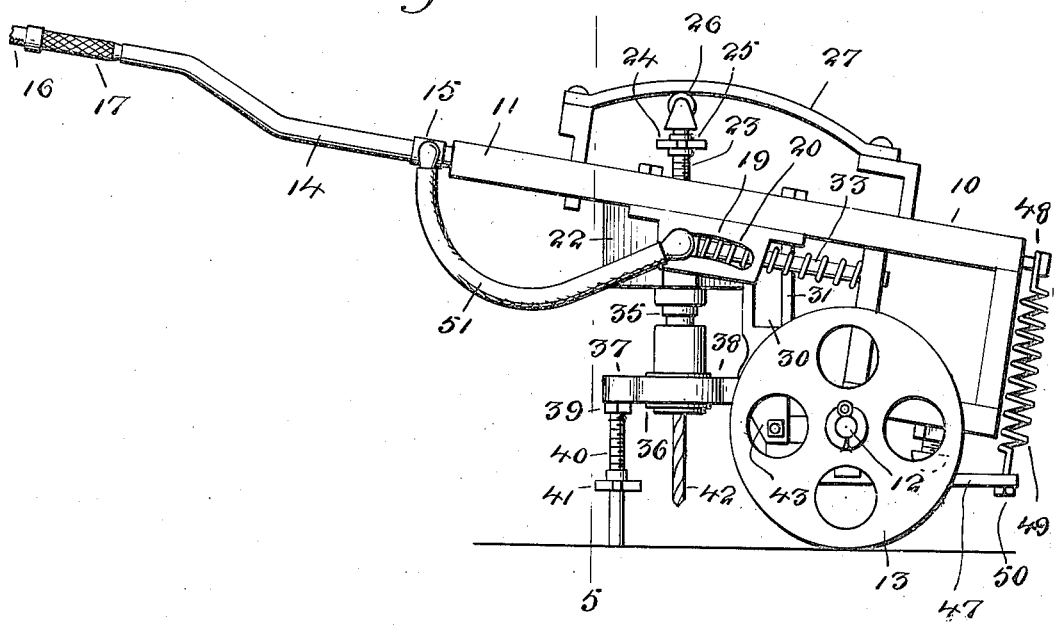
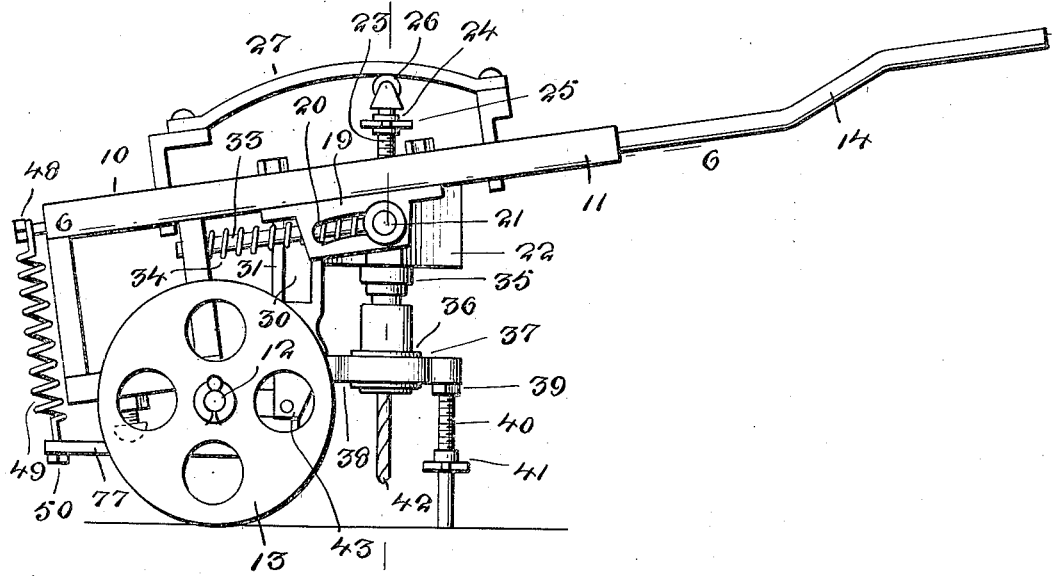
Witnesses
E. R. Ruppert
Inventor
E. L. Fogleman
By Victor J. Evans
Attorney E. L. FOGLEMAN.
DRILL.
APPLICATION FILED JUNE 8, 1918.
1,299,318.
Patented Apr. 1, 1919.
3 SHEETS—SHEET 2.
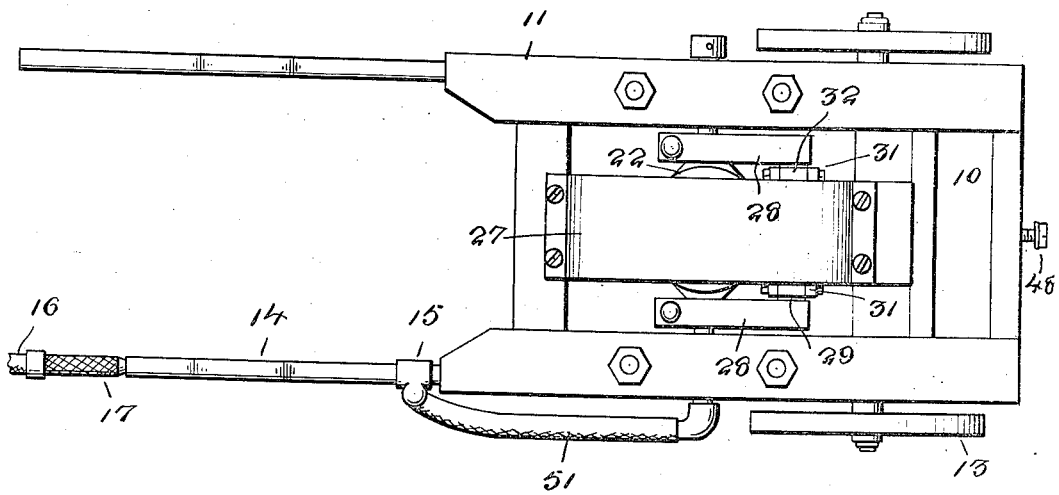
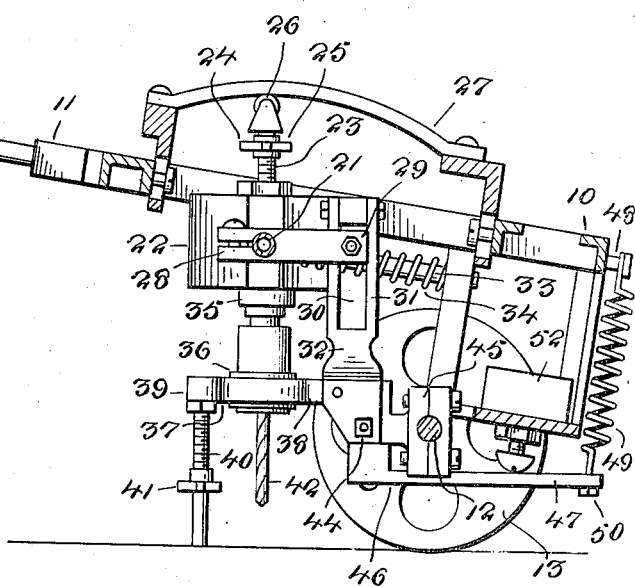
Witnesses
E. R. Ruppert
Inventor
E. L. Fogleman
By Victor J. Evans
Attorney

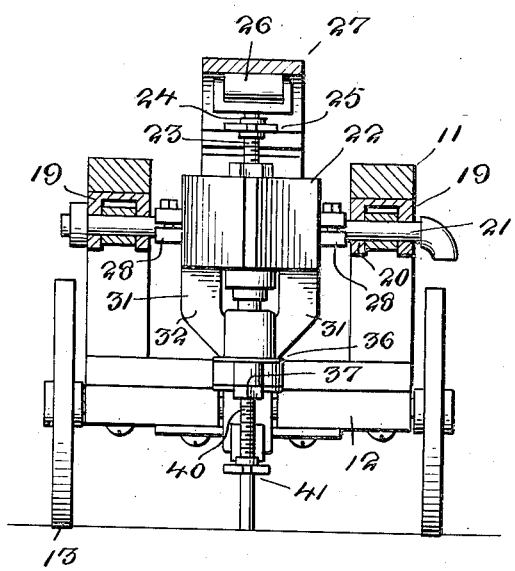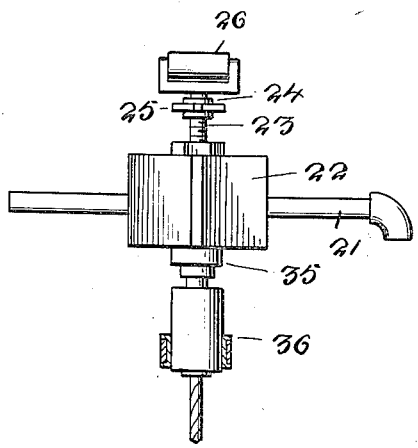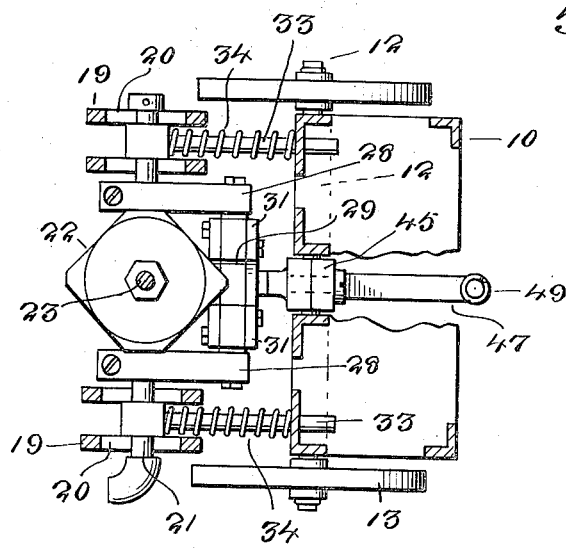

UNITED STATES PATENT OFFICE.

EDGAR L. FOGLEMAN, OF BALBOA, CANAL ZONE.

DRILL.

1,299,318.  Specification of Letters Patent.  Patented Apr. 1, 1919.

Application filed June 8, 1918. Serial No. 238,883.

*To all whom it may concern:*

Be it known that I, EDGAR L. FOGLEMAN, a citizen of the United States, residing at Balboa, in the Canal Zone, Panama, have invented new and useful Improvements in Drills, of which the following is a specification.

This invention has reference to air or electric motor operative drilling machines.

The object of the invention is to produce a portable motor driven drill whereby true straight holes may be made in plates over which the drill is moved in an easy and in an expeditious manner.

Other objects and advantages of the construction will appear as the nature of the invention is better understood, reference being had to the accompanying drawings, in which:

Figure 1 is a side elevation of a drilling apparatus constructed in accordance with my invention;

Fig. 2 is a similar view but looking toward the opposite side thereof;

Fig. 3 is a top plan view of the same;

Fig. 4 is an approximately central vertical longitudinal sectional view through the same;

Fig. 5 is a transverse sectional view approximately on the line 5—5 of Fig. 1;

Fig. 6 is a horizontal sectional view approximately on the line 6—6 of Fig. 2; and Fig. 7 is a detail vertical sectional view approximately on the line 7—7 of Fig. 2.

As disclosed by the drawings, I employ a frame which includes a box 10 and which, of course, is preferably constructed of metal and may be of any desired size or shape. The box 10 has an open top and is provided, upon its sides, at its said top with rearwardly extending parallel arms 11. The box 10 is mounted on an axle 12 which is arranged at or adjacent to the inner lower corner thereof, and on the said axle is journaled the ground wheels 13.

To the ends of the arms 11 are connected handle members 14, one of the same being hollow and provided at its inner slotted end with a nipple 15, the outer and open end of the said handle having connected thereto a flexible pipe or hose 16 leading to the fluid storage, and the fluid, entering through the hose 16, handle 14 and finding an outlet through the nipple 15 is controlled by a suitable valve 17, the said valve being conveniently located with respect to the operator of the drill. If desired, and as disclosed by the drawings the nipple 15 may be likewise provided with a valve 18 controlling the passage of fluid therethrough.

The arms 11, at a suitable distance to the rear of the box 10 have secured thereon or are provided with depending portions in the nature of brackets 19, each of the same having an elongated arcuate slot 20. These slots receive and provide bearings for the usual oppositely extending handles 21 of a motor 22 that is actuated by the fluid.

On the top of the motor is arranged a vertically extending threaded rod 23 that is engaged by a hollow cap nut 24, the said nut having spokes or a hand wheel 25 connected therewith, whereby the same may be secured in either direction on the threaded rod 23. On the outer end of the cap nut 24 is swiveled a roller 26 which may be in the nature of a centrally grooved member and which engages with a curved radius bar 27, the latter having its ends suitably, and preferably adjustably connected between the arms 11.

On the arms 21 of the motor 20 is loosely arranged parallel bars 28 respectively that have their free ends connected by a rod 29. The rod 29 is received in elongated slots 30 in the parallel arms 31 of the yoke-shaped end of a vertically disposed member 32.

Also loosely connected to the arms 21 of the motor, outward of the members 28 are rearwardly extending rods 33, the said rods passing through suitable openings in the rear wall of the box 10, and upon these rods, and exerting a tension between the arms of the motor and the rear wall of the box, are compression springs 34. The springs have a tendency to force the arms against one of the end walls of the arcuate slots 20 in the brackets 19.

The chuck carrying sleeve 35 for the motor 22 receives a bearing in a socket member 36 having secured thereto or integrally formed therewith oppositely extending arms 37 and 38 respectively, the said arms being disposed parallel to and approximately centrally between the arms 11 of the device. The arm 37 has on its outer end an interiorly threaded sleeve 39, the threads of the said sleeve being engaged by a threaded sustaining member 40, the latter having its upper end provided with a head 41, whereby the same may be turned in the socket, and consequently adjusted vertically with respect to the device.

The chuck of the member 35 has removably arranged therein a drill 42.

The arm 38 of the socket 36, which extends in the direction of the box 10 is preferably provided with an angular depending portion 43 to which the member 32 is secured, the securing elements being indicated by the numerals 44. The angle portion 43 of the arm 38 is provided with a substantially straight extension 45, which is connected to the axle 12, and if necessary to the bottom of the box 10. On the extension 45 is a depending element in the nature of a bracket 46, and to this bracket is connected a rod 47, the latter projecting centrally below the box 10. On the rear of the box is a lug 48 to which is secured one end of a tension spring 49, the opposite end of the said spring being adjustably connected to the outer end of the rod 47, as indicated by the numeral 50. One of the arms of the motor is hollow, and the numeral 51 designates a hose secured to the nipple 15 and to the referred to hollow arm of the motor, and whereby the operating fluid is delivered to the motor.

The box 10 is adapted to have arranged therein weights 52, which may be in the nature of scrap iron. The amount of iron arranged in the box varies in accordance with the character of work, or the size of the plates to be operated on by the drill. Sufficient weights are arranged in the box to prevent the rear of the device being raised when the drill is operated, or in other words the wheels 13 are, through the medium of the weights in the box sustained in ground engaging position. The tension spring 48 is of a sufficient strength to return the device to normal or operative position after the hole has been drilled by the drill. The socket member 36 provides a support for the drill, and the elements 40 and 42 provide a leg for the support. These last mentioned elements are not in the nature of a depth gage, but being arranged parallel with the drill insure the drill working at all times perpendicular to the plate being bored. By constructing the supporting leg of adjustable members a plate may be arranged between the wheels of the device and the device may be wheeled over the said plate to bore the same at desired intervals, the drill, as previously stated, being at all times directed in a line parallel to the leg of the support. The bars 28 connected to the rod 29 which plays in the elongated slot 30 in the parallel arms 31 of the yoke 32 assist in holding the drill in such position. Preferably the rod 47 is contacted by an adjustable element 55 which may be in the nature of a screw or bolt that enters the bottom of the box 10, and the adjustment of this member 55 further regulates the tensioning of the spring 50. When the box is tilted the springs 34, engaging with the arms that provide the trunnions for the motor will cause the said arms to travel outwardly in the slots 20 of the brackets 19, the roller 26, traveling over the radius bar 27. The drill 42 is elevated above the plate to be acted upon. When the operator exerts a downward pressure on the handles of the frame the drill 42 will be directed to its work, such pressure, of course, elevating the weighted end of the frames, the axle 12 and the wheels 13 carried thereby serving as fulcrum members. The drilling operation requires only a slight amount of physical exertion, and a release of pressure on the handles of the frame permits the spring 49 again to contract, causing the frame to tilt and to be returned to its initial position, and in so doing draws the bit out of the hole made thereby. The compression springs 33, in the return of the device to initial position likewise expand to arrange the arms 30 of the motor against the outer end walls of the arcuate slots 20 in the brackets 19, the slots in the said brackets being struck concentric with the radius bar 27. The device may be wheeled over the plate to be drilled in an easy and convenient manner, and by adjusting the leg 40 of the support the drill may be sustained in a perfectly vertical position or at any desired angle.

It is believed, from the foregoing that the construction, operation and advantages of the device will be apparent to those skilled in the art to which such inventions appertain, and it is to be understood that while I have illustrated and described a satisfactory embodiment of the improvement as it now appears to me I am not to be limited to such disclosure but am entitled to all such changes and modifications as fall within the scope of what is claimed.

While I have illustrated the drill as operated by an air motor, it is to be understood that the same may be actuated by an electric or any other desired motor. When an electric motor is employed switches therefor are arranged in a convenient position on the handles to the operator of the device.

Having thus described the invention, what is claimed as new, is:—

1. In a motor driven drill for the purpose set forth, a drill, supporting means for the drill including a leg depending therebeyond which is arranged in longitudinal alinement with said drill bit, a frame, supporting fulcrum members therefor, weighted means for retaining the fulcrum members in one position, when the frame is swung thereon and the drill moved to operative position, means between the frame and drill for influencing the latter when the frame is tilted, and spring means for normally retaining the frame in one position and the drill in inoperative position.

2. In a motor driven drill for the purpose set forth, the combination with a drill and a bit therefor, of supporting means for the drill including an adjustable leg arranged in longitudinal alinement with the drill bit and extending therebeyond, a wheeled frame to which the support is connected, weighted means on the frame for retaining the wheels thereof in ground contacting position when the frame is swung on the axles of said wheels to bring the drill to operative position, means carried by the frame and co-acting with the drill for influencing the latter, and spring means for normally sustaining the frame in one position and the drill in inoperative position.

3. In a motor drilling device for the purpose set forth, a wheeled frame, a drill having a bit, supporting means therefor, guide means between the drill and said supporting means, said supporting means including an adjustable leg arranged in longitudinal alinement with the bit and projecting therebeyond, adjustable spring means between the frame and the drill supporting means for normally tilting the frame and raising the bit to inoperative position, and means on the frame coöperating with the drill for moving the same longitudinally when the frame is tilted in one position.

4. In a motor operating drill for the purpose set forth, a wheeled frame, a drill including a bit, a support secured to the frame for said drill and including a longitudinal adjustable leg member arranged parallel with and extending beyond the drill when the latter is in inoperative position, guide means between the drill and the support therefor, spring influenced means for retaining the drill in alinement with the leg of the support when the frame is tilted, means carried by the frame and coöperating with the drill for moving the same to operative position, when the frame is tilted in one direction, weighted means for retaining the wheels in ground contacting position when the drill is operated, and spring means between the support for returning the frame and bit to initial position when relieved of pressure in one direction.

5. In a motor operated drill for the purpose set forth, a frame, a longitudinally movable motor journaled on said frame and carrying a drill, spring means for normally tilting the frame in one direction, spring means for moving the motor longitudinally of the frame when the latter is tilted by said first mentioned means, a fulcrum for the frame, and an adjustable sustaining member disposed outward of the drill and arranged parallel to the bit thereof.

6. In a motor operated drill for the purpose set forth, a frame having wheels journaled thereon, a box on said frame designed to receive weights therein whereby to sustain the wheels in ground contacting position, spring means for tilting the frame in one direction, adjusting means therefor, a longitudinally movable motor trunnioned on the frame, spring means for moving the motor in one direction when the frame is tilted, means arranged over the motor and contacting therewith for exerting a downward pressure thereon when the frame is tilted against the influence of the weighted and spring means, said motor carrying a drill, and an adjustable contact member disposed outward of the drill and arranged in parallelism with the drill bit.

7. In a motor driven drill for the purpose set forth, a wheeled frame including a weight containing box, a longitudinally movable motor pivotally arranged between the sides of the frame and movable longitudinally with respect to the frame, spring means between the frame and motor for normally sustaining the same in one position, and adjustable means carried by the frame and motor for sustaining the motor angularly with respect to the frame.

8. In a motor driven drill for the purpose set forth, a frame having a weight containing box at one end thereof, wheels journaled on the box at the lower and inner corner thereof, a motor trunnioned between the sides of the frame and movable longitudinally thereon, a chuck carrying member associated with the motor, a guide sleeve carried by the frame for said member, and a vertical adjustable element carried by said sleeve and disposed outward therefrom and arranged in parallelism with the bit of the drill.

9. In a motor driven drill for the purpose set forth, a frame having a box at one end thereof designed to receive weights therein, a shaft at the lower and inner corner of the frame, wheels journaled thereon, an arm secured to the shaft and extending therefrom, a vertical sleeve on said arm, a threaded socket on the outer end of the said arm, a motor trunnioned between the sides of the frame and movable longitudinally thereof, a chuck carrying member connected with the motor and journaled in the sleeve, a drill bit for the chuck, a vertically disposed threaded member in the socket, means between the frame and the motor for normally sustaining the same horizontally, spring means between the frame and motor for normally retaining the same in one position, a rod secured to the axle, and a tension spring between said rod and the box.

10. In a motor driven drill for the purpose set forth, a frame having a box at one end thereof designed to receive weights therein, depending slotted brackets on the sides of the frame, a motor having laterally extending arms arranged in said slots, an axle secured to the box, wheels journaled on the ends of said axle, a rearwardly extending arm secured to the axle, a sleeve thereon, a threaded socket on the outer end of the arm, a chuck carrying member arranged in said sleeve and influenced by the motor, a drill bit therefor, a threaded member engaging in the socket, rearwardly depending members loosely journaled on the arms of the motor, a connecting element therefor, a vertically disposed slotted member carried by the first mentioned arm and receiving the last mentioned arm, rods loosely connected to the arms of the motor and passing through the box, springs on said rods exerting a tension between the box and the arms of the motor, a laterally extending arm on the motor, a cap nut engaging said rod, a roller swiveled on said cap nut, and an arcuate radius bar secured to the frame and engaged by said roller.

11. In a motor driven drill for the purpose set forth, a frame having a box at one end thereof designed to receive weights therein, depending slotted brackets on the sides of the frame, a motor having laterally extending arms arranged in said slots, an axle secured to the box, wheels journaled on the ends of said axle, a rearwardly extending arm secured to the axle, a sleeve thereon, a threaded socket on the outer end of the arm, a chuck carrying member arranged in said sleeve and influenced by the motor, a drill bit therefor, a threaded member engaging in the socket, rearwardly depending members loosely journaled on the arms of the motor, a connecting element therefor, a vertically disposed slotted member carried by the first mentioned arm and receiving the last mentioned arm, rods loosely connected to the arms of the motor and passing through the box, springs on said rods exerting a tension between the box and the arms of the motor, a laterally extending arm on the motor, a cap nut engaging said rod, a roller swiveled on said cap nut, and a radius bar having its ends adjustably connected to the frame and engaged by said roller.

In testimony whereof I affix my signature.

EDGAR L. FOGLEMAN.